F. W. GORDON.
PROCESS FOR CONDENSING METALLIC VAPORS.
APPLICATION FILED MAR. 22, 1911.
1,053,592.
Patented Feb. 18, 1913.
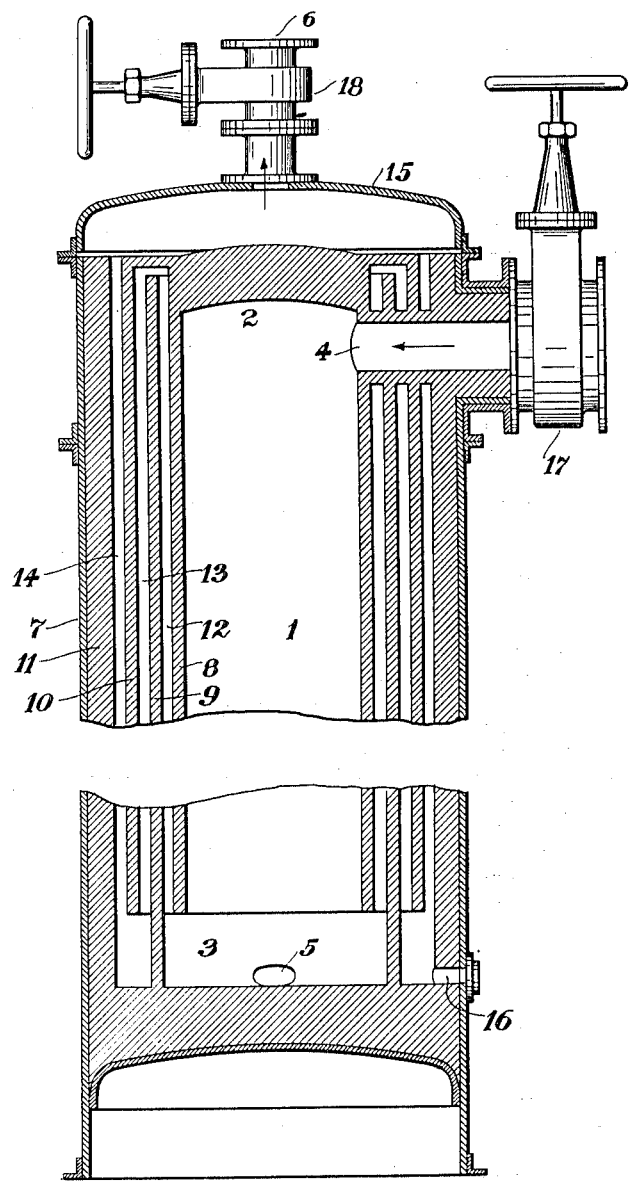
Witnesses
Inventor
Frederick W. Gordon

UNITED STATES PATENT OFFICE.

FREDERICK W. GORDON, OF FORT WASHINGTON, PENNSYLVANIA.

PROCESS FOR CONDENSING METALLIC VAPORS.

1,053,592.  Specification of Letters Patent.  Patented Feb. 18, 1913.

Application filed March 22, 1911. Serial No. 616,105.

*To all whom it may concern:*

Be it known that I, FREDERICK W. GORDON, a citizen of the United States, residing at Fort Washington, Montgomery county, Pennsylvania, have invented certain new and useful Improvements in Processes for Condensing Metallic Vapors, of which the following is a specification.

Where a metallic vapor, zinc especially for instance, is diffused with large quantities of gas so that the weight of the gas is from one to eight times the weight of the vapor, great difficulty has been experienced in securing an efficient condensation of the vapor, the deficiency being due either to the fact that the vapor has not reached the temperature of liquefaction under proper conditions, in which event uncondensed vapor will waste out of the condenser with the gases, or that the vapor had reached a temperature of congelation under improper conditions, in which event fume will be formed and waste out of the condenser with the gases. It is to be assumed that the gas associated with the vapor is an indifferent one, as would be the case with carbon monoxid with nitrogen, while carbon dioxid would be fatal as it would convert the zinc more or less into oxid of zinc. Furthermore, under favorable working there is a possibility of some uncondensed metal in the form of snow being carried out of the condenser, and the gases passing from the condenser are always likely to contain more or less combustion value.

My present invention aims at a condensing process for metallic vapors designed to enhance the efficiencies of the metallic recoveries and to conserve the combustion values in the gases passing from the condenser, and the invention will be readily understood from the following description taken in connection with the accompanying drawing which is a vertical longitudinal section of an exemplifying apparatus which may be employed in carrying out my invention.

The mixture to be dealt with by the process may be assumed as being composed of zinc vapor and an indifferent gas, the weight of the gas being from one to eight times that of the vapor. The temperature of the mixture to be dealt with may be taken as being at from 700 deg. C. to 850 deg. C. A temperature higher than 850 deg. C. would be indicative of a waste of heat in the reducing process employed in the production of the vapor, and a temperature materially lower than 700 deg. C. would be indicative of condensation of some vapor before the mixture was brought to the condenser to be subjected to the recovering process of condensation.

The phenomenon of condensation in such a mixture as has been referred to may be considered as comprehending an exceedingly rapid but random succession of collisions between the molecules of the vapor, the coalescence being retarded by the resistance offered by the gas molecules. Coalescence of vapor molecules even under conditions otherwise favorable might call for many repeated collisions between two given vapor molecules owing to lack of effective intimacy of contact brought about by the resisting gas molecules and owing to rebound between vapor molecules in collision. Therefore, as regards this matter alone, coalescence requires time in which random motions may by successive efforts result in success. But, regardless of other matters, coalescence cannot take place until the colliding vapor molecules reach a temperature below that of vaporization of the metal at a given pressure. There must therefore be time for effective collisions of vapor molecules while those molecules are at or below the temperature of liquefaction. It might therefore be apprehended that the condensation of the hot vapor would require simply a lowering of the temperature of the vapor to a point below that of liquefaction. But sight must not be lost of the fact that the collisions to bring about coalescence are due to the motion-conditions constituting heat and the abstracting of heat would mean the lessening of colliding capacity to greater or less extent. Furthermore, and still more important, if the vapor molecules should reach the temperature of congelation before coalescence then fume instead of condensed metal would be produced in the condenser and this fume would waste out of the condenser with the gas. It will therefore be apprehended that the vapor in having its temperature reduced for purposes of condensation must remain in a zone having a temperature at or below that of liquefaction for sufficient length of time to permit random collisions to become effective in producing coalescence; that these collisions are dependent on the presence of heat and are in some proportion dependent on the temperature; that the premature lowering of the temperature produces fuming instead of condensation; that, whether there be or be not fuming, uncondensed vapor will waste out of the condenser; and that whether there be or be not condensation, any fumed vapor will waste out of the condenser.

In my improved process I deal with a mixture composed of a metallic vapor and an indifferent gas having a weight from one to eight times that of the vapor. I force the mixture into and through a conduit having at its terminal end a temperature below that of liquefaction and above that of congelation, the temperature within the condenser decreasing from its receiving to its terminal end. I retard the flow of mixture through the condenser, as measured by time, to such extent that the vapor will have time for coalescence while passing through a zone having gradually lowering temperature of liquefaction. The result is that time is given for coalescing collisions of the molecules of the vapor to bring about condensation of the vapor and prevent any of the vapor wasting away as vapor or fume. No heat is intentionally or deliberately abstracted from the condenser in any usual manner but, on the contrary, the mixture passing through the condenser is kept hot either by careful conservation of the heat of the mixture or by the extraneous application of heat. The process is preferably carried on under pressure.

In the drawing I show, in vertical longitudinal section, an exemplifying condenser in which my process may be carried on.

In the drawing:—1, indicates the condenser indicated as a vertically disposed cylindrical chamber of great volume and walled by refractory material, as fire-brick; 2, the initial end of the condensing chamber; 3, the terminal end of the condensing chamber; 4, the inlet-conduit leading to the initial end of the condensing chamber and adapted for connection with the source of supply of the mixture whose vapor is to be condensed; 5, a closed outlet at the terminal end of the condensing chamber to permit of the discharge of the liquid metal resulting from the condensation; 6, the outlet pipe from the terminal end of the condensing chamber to permit the outflow of the gas after the condensation of the vapor, this outlet being, in the example, indirectly connected with the condensing chamber; 7, a metallic shell of the general structure, which is preferably to be gas-tight and of such strength as to resist a very considerable internal pressure, say fifty or sixty pounds the square inch; 8, the inwall of the condensing chamber, this wall stopping short of the base of the condensing chamber; 9, a wall exterior to and concentric with wall 8 and extending upward from the base of the condensing chamber; 10, a wall exterior to and concentric with wall 9 and stopping short of the level of the base of the condensing chamber; 11, a shell-lining wall exterior to and concentric with wall 10 and extending down to the level of the base of the condensing chamber; 12, an up-pass formed between walls 8 and 9 and extending from the base of the condensing chamber to the top of wall 9; 13, a down-pass between walls 9 and 10 communicating with the top of up-pass 12 and extending down to the base of wall 10; 14, an up-pass, formed between walls 10 and 11, and communicating at its base with the base of down-pass 13, and open at its upper end; 15, a discharge-chamber communicating with the upper end of up-pass 14 and with outlet-conduit 6; 16, a closed opening at the base of up-pass 14; 17, a valve which may, if desired, be provided upon inlet-conduit 4 for controlling the rate of in-flow through that conduit; and 18, a valve which may, if desired, be provided upon outlet-conduit 6 to provide for controlling the rate of out-flow through that conduit.

It is manifest that the rate of flow of mixture through the condenser may be controlled either by regulating the rate at which the mixture is generated and passed to the condenser, or by controlling the rate of inflow, as by means of valve 17, or by controlling the rate of outflow, as by means of valve 18. The mixture may be forced into the condenser by any suitable means, as by the pressure resulting from the generation of the mixture, or by draft upon the outlet from the condenser, and where the apparatus is to be worked under considerable pressure, which is the preferable method, the forceful inflow may be derived from the blast pressure in case the mixture be generated under blast pressure, or from any suitable forcing means for injecting the mixture into the condenser.

The mixture is to be composed of metallic vapor and an indifferent gas having a weight from one to eight times that of the vapor and is to be admitted into the initial end of the condensing chamber at a temperature not materially lower than the temperature of saturation. The mixture moving slowly through the condensing chamber will, by the passage of heat through the condenser wall, reach succeeding zones of gradually decreasing temperature, some condensation taking place as soon as mixture shall have reached a zone at temperature immediately below saturation, the condensed metal dropping to the base of the condenser and more condensation taking place at succeeding and cooler zones. Under usual considerations of the phenomenon of condensation, the mixture would be permitted to cool as rapidly as the heat could be gotten to pass away from the condenser walls, and this cooling would often be accelerated by artificial methods. But in my process, when using the exemplifying apparatus, I carefully conserve the heat of the mixture by means of the hot gases surrounding the condensing chamber in their movements through the up and down passes on their way to the outlet, and the heat of the mixture in the condenser must be so maintained that the temperature at the terminal end of the condenser, the base of the condensing chamber in the exemplifying structure, is above that of congelation. The result is that time is given for coalescence of the vapor molecules before the temperature of congelation is reached, and this time may be insured by controlling the rate of flow through the condenser. The liquid metal may be removed from the base of the condenser through opening 5. With proper adjustment of conditions the condensation should be as perfect as can be practically hoped for but if, by any chance, condensation in the condensing chamber should be incomplete and some condensation take place in the gas passages surrounding the condenser, the results of the condensation in those passages may be removed through the opening 16.

The mixture enters the top of the condenser at or above saturation temperature and, temperature and vapor-tension decreasing as the mixture descends, vapor-molecules form globulets which descend at higher rate through the leaner mixture and pick up globulets therefrom, splitting the globulets in some cases, thus greatly increasing the rapidity of condensation over that possible from mere coalescence of vapor molecules. The rain of condensed metal reaches the bottom pool, and the mixture sweeping thereover to leave the condensing chamber yields up to the pool the final extractable metal. The long vertical uninterrupted fall of the rain of condensation through the mixture manifestly brings about a condensing efficiency not attainable if the condenser were arranged horizontally, for in that case if the mixture were injected into the end of the condensing chamber the globulets would follow the law of projectiles and drop in a parabolic curve to the lower side of the condenser without giving the time essential to high efficiency in condensation.

The time for coalescence of the zinc molecules is of primary importance and large volume for the condensing chamber or conduit through which the mixture passes is essential and this volume for the condensing chamber is to be secured by diameter rather than by length, increase in length not being consistent with proper conservation of the heat of the mixture in the condenser. There are of course practical limits to the size of the condenser in constructing it, and recourse is therefore had to carrying the mixture under heavy pressure in the condenser. The metallic shell of the condenser is to be tight and strong and adapted for a pressure of, say, sixty pounds absolute per square inch, the rate of flow of mixture through the condenser will be inversely as the pressure, the time of exposure of the mixture in the condenser being therefore in proportion to the pressure. Furthermore, increasing the pressure brings the zinc molecules closer together and enhances the coalescing effectiveness of the encounters between the molecules.

Were condensation within the condenser perfect, and were no thought to be given to the combustion value of the gases leaving the condenser, outlet 6 might of course lead to the atmosphere, but in a full utilization of the system, outlet 6 is to be connected with a combustion-chamber, a boiler furnace, for instance, and the connection, on its way to such combustion chamber, is to include a closed bin or bins containing ore or coke or both. The result of this arrangement is, first, that the gases, in passing through the ore or fuel or both in the bin or bins dry the ore or fuel or both and thus, to a great extent, avoid the charging of moist ore and fuel into the reducing furnace; and, second, that the uncondensed metal in the form of snow in the gases becomes taken up by the ores and fuel, thus adding to the metallic value of the ore; and, third, the combustion value of the gases is utilized in the boiler furnace of other combustion chamber.

I claim:—

1. That improvement in the process of recovering metals from gases carrying at most their own weight of metallic vapor, which consists in forcefully moving the diffused mixture of vapor and gas into and through a conduit, and gradually lowering the temperature of the vapor and gas at a rate so low as to permit of a practically complete coalescence of the metallic molecules before the gas and vapor reach a temperature of congelation, substantially as set forth.

2. That improvement in the process of recovering metals in diffusion with gases, which consists in forcefully moving the diffused mixture of vapor and gas into and through a conduit, lowering the temperature of the mixture as it passes through the conduit, and causing the hot gases leaving the conduit to surround the same to decrease the rate at which the temperature of the mixture in the conduit will be lowered, substantially as set forth.

3. That improvement in the process of recovering metals in diffusion with gases, which consists in forcefully moving the diffused mixture of vapor and gas into and downward through a vertical conduit, and gradually lowering the temperature of the descending vapor and gas at a rate so low as to permit of a practically complete coalescence of the metallic molecules before the gas and vapor reach a temperature of congelation, substantially as set forth.

4. That improvement in the process of recovering metals in diffusion with gases, which consists in forcefully moving the diffused mixture of vapor and gas into and downward through a vertical conduit, and gradually lowering the temperature of the descending vapor and gas at a rate so low as to permit of a practically complete coalescence of the metallic molecules before the gas and vapor reach a temperature of congelation, establishing a pool of the molten metal at the foot of the conduit, and causing the mixture leaving the conduit to pass over said pool, substantially as set forth.

5. That improvement in the process of recovering metals in diffusion with gases, which consists in forcefully moving the diffused mixture of vapor and gas into and through the condenser and maintaining the mixture under pressure while passing through the conduit, substantially as set forth.

6. That improvement in the process of recovering metals in diffusion with gases, which consists in forcefully moving the diffused mixture of vapor and gas into and through a conduit, lowering the temperature of the mixture as it passes through the conduit, causing the hot gases leaving the conduit to surround the same to decrease the rate at which the temperature of the mixture in the conduit will be lowered, and maintaining the mixture under heavy pressure while passing through the conduit, substantially as set forth.

7. That improvement in the process of recovering metals from gases carrying at most their own weight of metallic vapor, which consists in forcefully moving the diffused mixture of vapor and gas into and through a conduit, and gradually lowering the temperature of the vapor and gas at a rate so low as to permit of a practically complete coalescence of the metallic molecules before the gas and vapor reach a temperature of congelation, and conveying the gases leaving the conduit to a mass of unreduced ore and fuel, substantially as set forth.

8. That improvement in the process of recovering metals from gases carrying at most their own weight of metallic vapor, which consists in forcefully moving the diffused mixture of vapor and gas into and through a conduit, and gradually lowering the temperature of the vapor and gas at a rate so low as to permit of a practically complete coalescence of the metallic molecules before the gas and vapor reach a temperature of congelation, and conveying the gases leaving the conduit through a drying chamber, and to a combustion chamber, substantially as set forth.

9. That improvement in the process of recovering metals in diffusion with gases, which consists in forcefully moving the diffused mixture of vapor and gas into and through a condenser gradually lowering the temperature of the vapor and gas, and conveying the gases leaving the condenser through a drying chamber, substantially as set forth.

FREDERICK W. GORDON.

Witnesses:
JOSEPH L. LACKNER,
MARGARET F. HACKETT.